Patented Nov. 21, 1950

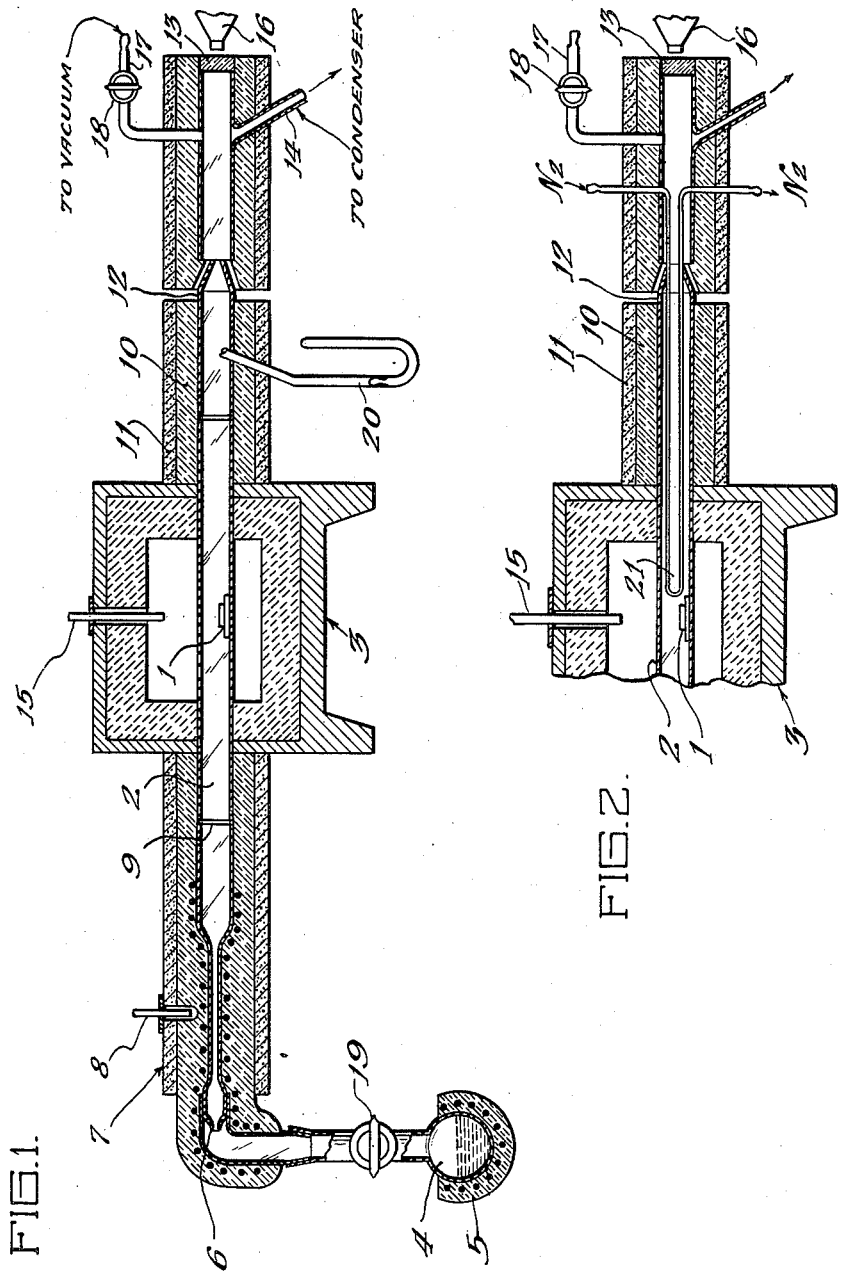

2,531,143

UNITED STATES PATENT OFFICE 2,531,143

METHOD OF PURIFYING BERYLLIUM OXIDE

John G. Malm and Clyde A. Hutchison, Jr., Chicago, Ill., assignors to the United States of America as represented by the United States Atomic Energy Commission Application November 19, 1948, Serial No. 61,138

4 Claims. (Cl. 23—140)

This invention relates to a process for the preparation of compositions and structures of beryllium oxide, and, more particularly, to a process for the preparation of beryllia of improved purity and decreased density.

An object of this invention is to provide a process for the transfer and purification of beryllium oxide.

A further object of this invention is to provide a method for vaporizing beryllium oxide to yield a volatile compound which on cooling forms a stable composition having improved properties which make it particularly suitable for use at high temperatures as either an insulating material or a refractory.

A still further object of this invention is to provide a process for the rapid volatilization of beryllium oxide thereby affording a simple, rapid and expedient means for batch or continuous operations involving the transfer of beryllium oxide.

Other objects and advantages of this invention will be apparent upon further examination of the specification.

We have discovered that beryllia heated in contact with steam reacts readily at elevated temperatures. Apparently this reaction of steam with beryllia involves the formation of a volatile beryllium compound such as beryllium hydroxide or hydrates of beryllium hydroxide in vapor form. When this volatile reaction product comes in contact with a cooler surface or when the entire beryllia-steam system itself is cooled in any suitable manner, the high temperature reaction is reversed resulting in the deposition of needle-like beryllia crystals measuring approximately 0.2 millimeter in length. These small hexagonal crystals have an extremely high luster, are quite soft and show no evidence of tarnishing.

In accordance with the principal embodiment of this invention, steam is passed over beryllia at an elevated temperature. The rate of reaction between beryllium oxide and steam increases exponentially with the temperature. The process may be carried out at temperatures between 1000° C. and the melting point of the starting material or even higher temperatures. A preferred temperature range is between 1200° C. and 1700° C. with a temperature of about 1500° C. as a suitably convenient level. By heating samples of beryllium oxide between 1450° C. and 1500° C., products are obtained having a maximum decrease in density of the order of about 6 percent.

As will be shown in Example IV the reaction rate for the above-described beryllia-steam reaction increases with the increase in the flow rate of steam. At a given temperature and a constant steam pressure an increase in the rate of mass flow of steam results in an increase in the reaction rate. However this increase in reaction rate is not proportional to the increase in the steam flow rate, but tends to increase less rapidly toward a limiting value. In carrying out the process of this invention it is preferred that steam pass over the beryllia at a mass flow rate of at least 0.1 mol of steam per minute.

In the practice of the process of this invention, the starting material may be in the form of either beryllia powder or pellets of beryllia. On comparison of the reaction rate obtained when using unpressed beryllia powder with values obtained by reacting beryllia pellets with steam, only a slight difference in the rate of reaction has been observed where the pellet surface area has been varied up to a factor of five. For example at a temperature of 1500° C. and a steam flow rate of 0.11 mol/min. at atmospheric pressure, the beryllia removed by the steam from the starting material is only a minor function of the surface area of the pellet. Under such conditions, the rate-area coefficient is $1.7 \times 10^{-4}$ gram per cm.$^2$ per minute.

In the following examples the beryllia pellets were made from about 5 grams of high-fired beryllia powder of about 125 mesh size mixed with 0.5 cubic centimeter of 6 molar nitric acid as a binder. The wet pellets were then suitably formed by means of a die and arbor press and then dried for about eighteen hours at 100° C. followed by firing for one hour in stagnant air at 1650° C.

Referring to Figures 1 and 2, an apparatus suitable for carrying out the process of this invention and used in the following examples consisted of a platinum M-cross-section tray 1 to hold the starting material which was inserted into the center portion of a mullite tube 3.6 centimeters inside diameter and 75 centimeters long. The tube 2 was heated by a furnace 3 which surrounds the central portion.

To generate steam, the apparatus included a round-bottomed flask 4 made of low alkali content borosilicate glass (enclosed in a suitable heating mantle 5), a baffle 6 to prevent mechanical transport of water, a preheater 7 of glass tubing wound with resistance wire, and a thermocouple 8 to indicate the preheater temperature. The preheater 7 was sealed to one end of the mullite tubing 2 at 9 with a glass-like sealing material. The preheater 7, seal 9, and exposed mullite tubes 2 were lagged with asbestos paper 10 and magnesia 11 insulation. The mullite tube 2 at the other end was sealed with glass-like material to a heat resistant borosilicate glass joint 12 into which was fitted an assembly incorporating an optical window 13 and an exit tube 14 connected to a water-cooled condenser (not shown). The sample may be introduced at this joint 12. The temperature of the mullite 2 was measured by a thermocouple 15 of platinum and a platinum-rhodium alloy and the pellet temperature was determined by an optical pyrometer 16.

For steam pressures below atmospheric, a high vacuum pump (not shown) was attached to the apparatus at 17 through a stopcock 18, the water-cooled condenser was replaced by a carbon dioxide-acetone-cooled trap (not shown) and a stopcock 19 was added between the water flask 4 and the furnace 3. A monometer 20 was attached to the apparatus near the exit end of the mullite tube. For experiments at very low distillation rates the water flask 4 was replaced by a double walled flask (not shown) with amyl acetate refluxed in the space between the walls.

As a convenient means for the collection of the steam-treated BeO, a metal tube which served as a cold finger 21 was inserted into the reaction tube 2, the tip of this cold finger being made of thin-walled $\frac{1}{8}''$ outside diameter platinum tubing which was sealed to $\frac{3}{16}''$ outside diameter copper tubing with gold wire as solder. The copper tubing was then sealed with silver solder to larger copper tubing, which, in turn was sealed to the glass tubing sealed through the reaction tube to the outside. The tip of the platinume tube was about 1 centimeter removed from the beryllia pellet on the side opposite the steam source. Nitrogen gas was used as a coolant in this cold finger.

EXAMPLE I

Nearly pure beryllia half-cylinders weighing about 2 grams, measuring 19 millimeters in diameter and 8 millimeters in length, and having a density of 2.38 grams per cubic centimeter, were prepared by bisecting fired beryllia pellets made as previously described. These pellets were placed in a platinum boat within the previously described mullite reaction tube. Water at one atmosphere pressure was passed through the tube which was held at temperatures ranging between 1483° C. and 1528° C. The percent weight of beryllia reacting with steam during the indicated intervals is tabulated below:

| Time, Hours | Weight Per Cent BeO Transferred |
|---|---|
| 4.13 | 1.7 |
| 6.80 | 5.6 |
| 10.80 | 10.3 |
| 15.05 | 13.5 |

X-ray examination of the product showed that the white cotton-like crystal mass which condensed on the cold finger within the tube was pure beryllia.

A further embodiment of this invention comprises the removal of certain impurities normally associated with commercial beryllium oxide by heating commercial beryllium oxide in contact with steam at temperatures within the same temperature range set forth for use in the first embodiment of this invention. Both metal and non-metal impurities, for example, impurities containing silver, aluminum, iron and silicon in the form of the metal oxides or salts, and which are normally associated with beryllium oxide can be removed therefrom by this process as shown in Example II.

EXAMPLE II

Steam was distilled at the rate of 15 liters/min. over commercial beryllia pellets, containing the impurities normally associated therewith, which were heated to 1500° C. The temperature of the platinum tube near the pellet was 1400° C. After a period of 2½ hours, a mass of white needle-like crystals about 0.2 millimeter in length had deposited on the end of the platinum tube. The purity of this product is evidenced by the results obtained by means of spectrographic analyses and shown in the following table.

| Element | Approximate Concentration of Impurity, Per Cent | |
|---|---|---|
| | Original BeO Pellets | BeO Crystals |
| Ag | <0.01 | not detected. |
| Al | >1.0 | ca. 0.01. |
| Fe | ca. 1.0 | not detected. |
| Si | ca. 1.0 | ca. 0.01. |

EXAMPLE III

Experiments similar to those described in Example I were carried out at a steam pressure of 1 atmosphere with steam passing over the samples at a rate of 0.11 mol/min. in a tube measuring 3.6 centimeters inside diameter. The percentages of beryllia volatilized by the steam at various temperatures are shown as follows:

| Temperature, °C. | Weight Per Cent BeO Transferred in 2.5 Hours |
|---|---|
| 1,000 | 0.01 |
| 1,250 | 0.19 |
| 1,400 | 0.66 |
| 1,500 | 1.58 |
| 1,550 | 2.24 |

EXAMPLE IV

The following tabular data illustrate the degree to which the rate for the beryllia-steam reaction is affected by the flow rate for steam.

*Effect of steam flow rate on the BeO-steam reaction*

| Amount of $H_2O$ Condensed. ml./min. | Steam Flow[1] Rate, liter/min. | Temp.. °C. | Weight Per Cent BeO Transferred |
|---|---|---|---|
| 0.1 | 0.81 | 1,500 | 0.93 |
| 0.1 | 0.81 | 1,500 | 0.90 |
| 0.25 | 2.02 | 1,500 | 1.00 |
| 0.5 | 4.05 | 1,500 | 1.21 |
| 0.5 | 4.05 | 1,500 | 1.17 |
| 1.0 | 8.10 | 1,500 | 1.45 |
| 2.0 | 16.20 | 1,500 | 1.58 |
| 6.0 | 48.60 | 1,500 | 2.10 |
| 0.6 | 4.58 | 1,400 | 0.45 |
| 1.0 | 7.63 | 1,400 | 0.52 |
| 2.0 | 15.26 | 1,400 | 0.64 |

[1] Volume flow rate at furnace temperature.

The process and apparatus disclosed in the present application are intended to be illustrative rather than limiting in scope. The numerous modifications and equivalents thereof will be apparent to those skilled in the art and are therefore included in the scope of the present invention. Therefore only those limitations indicated in the appended claims should be imposed upon the scope of this invention.

What is claimed is:

1. A process for the purification of beryllia from the impurities normally associated therewith, comprising heating said beryllia in contact with steam to a temperature from 1000° C. to the melting point of beryllia and cooling the resultant beryllia-containing vapor to yield a condensate of beryllia.

2. A process for the preparation of a beryllia insulating material comprising heating solid beryllia to a temperature between 1200 and 1700° C. in the presence of steam up to about 1 atmosphere of pressure and flowing at a rate of at least 0.1 mol per minute, cooling the resultant beryllia-containing vapor to yield a condensate of pure beryllia and removing the steam from said condensate.

3. A process for the purification of beryllia from the impurities normally associated therewith comprising heating said beryllia in contact with steam at a temperature of about 1500° C., cooling the beryllia-containing vapors thus formed to condense beryllia, removing the steam, and collecting the cooled beryllia condensate.

4. A process for the purification of beryllia comprising heating beryllia having an aluminum-containing impurity in contact with steam at a temperature of about 1500° C., cooling the beryllia-containing vapor formed thereby to condense beryllia, removing the steam, and collecting the cooled purified beryllia condensate.

JOHN G. MALM.
CLYDE A. HUTCHISON, Jr.

No references cited.